United States Patent Office 3,423,573
Patented Jan. 21, 1969

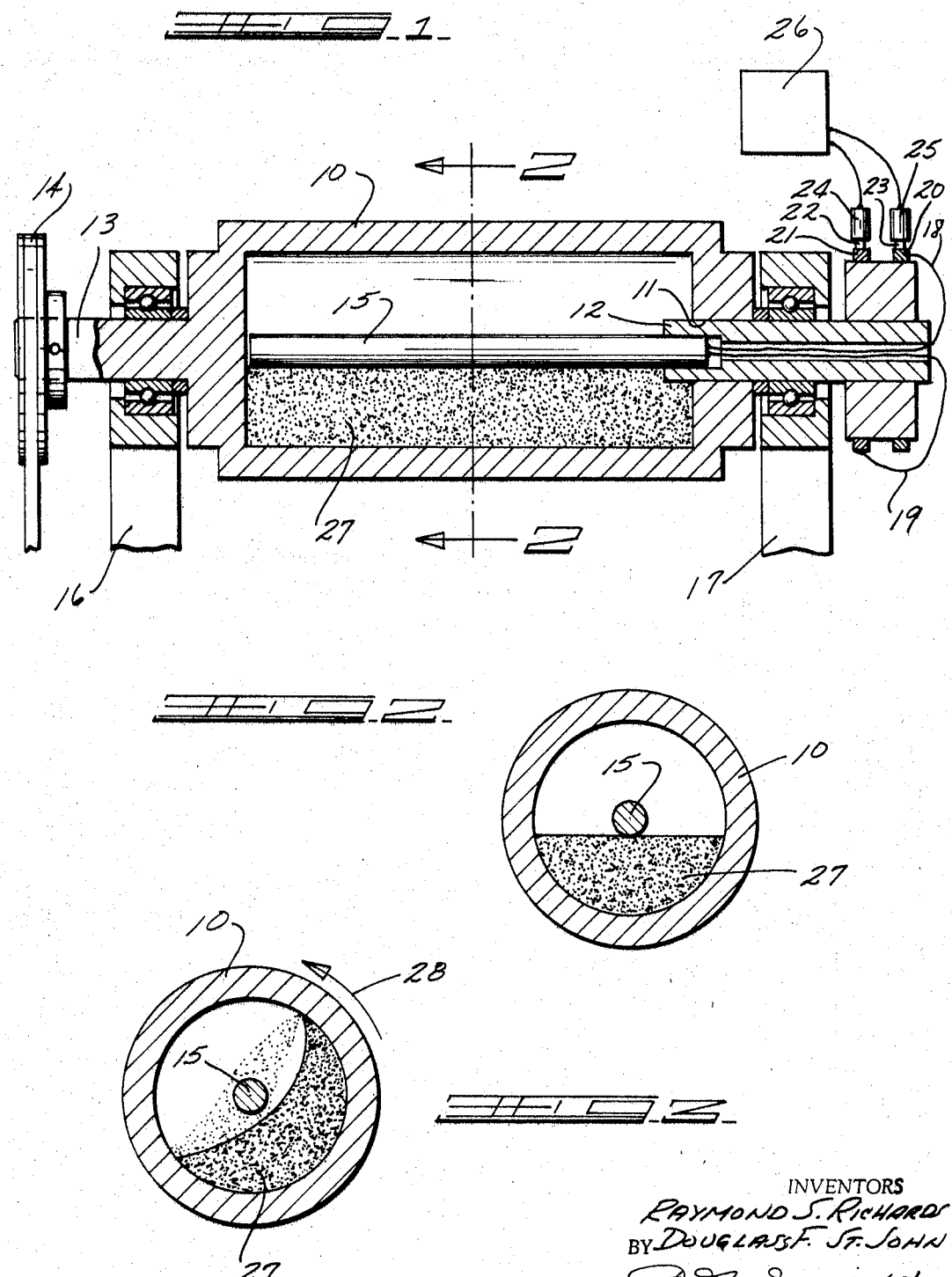

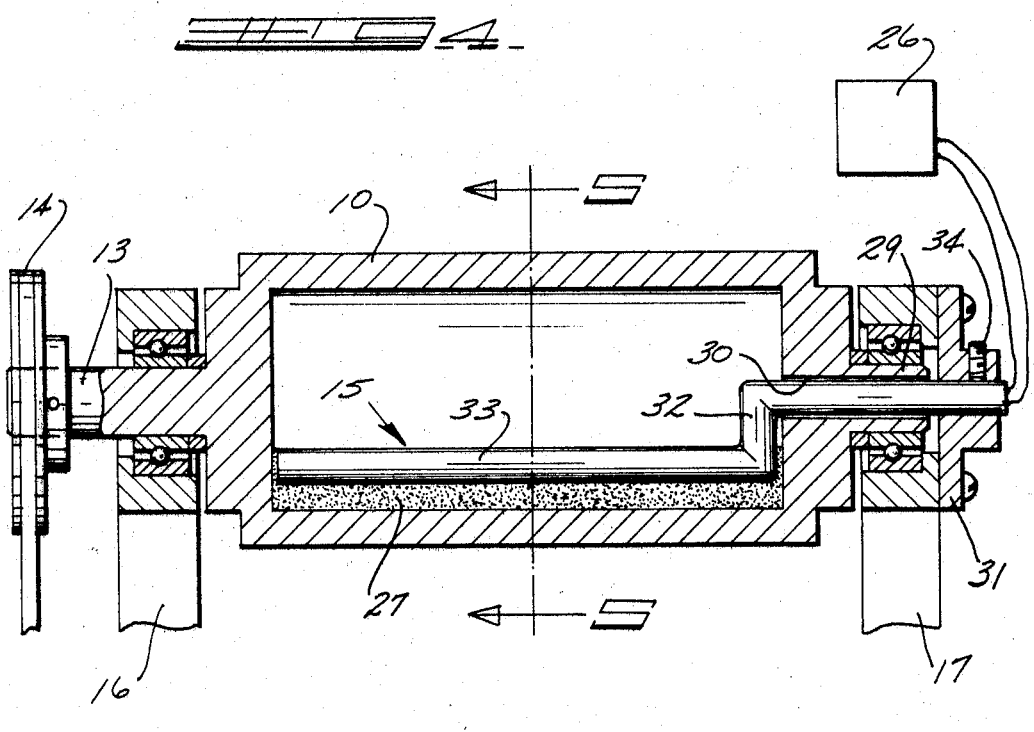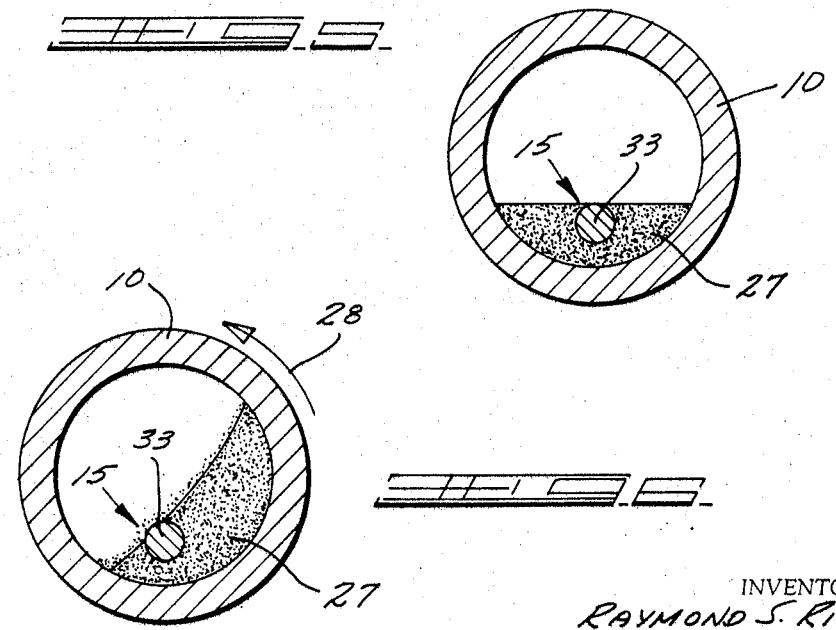

3,423,573
METHOD AND APPARATUS FOR HEATING ROLLERS
Raymond S. Richards and Douglass F. St. John, Toledo, Ohio, assignors to Owens-Illinois, Inc., a corporation of Ohio
Filed Sept. 7, 1965, Ser. No. 485,424
U.S. Cl. 219—469          9 Claims
Int. Cl. B21b 27/06; H05b 3/02

ABSTRACT OF THE DISCLOSURE

The heating of a roller by placing an electric heater or tubular heating member within the interior of the roller and partially filling the roller with particulate matter, such as sand, in sufficient quantity such that upon rotation of the roller the sand will flow by gravity over the heating element and serve as a mechanical means for transferring heat from the central heater to the inner surface of the hollow roller.

---

It has been the practice in the past to heat rollers, for example, rollers used in 2 and 3 roll mills or heated rollers for printing presses or laminating and embossing machines by locating an electric heating element axially of the roller and then providing a heating transfer medium between the heater and the interior of the roll. The hollow roll mills in which the rolls are heated have conventionally utilized a liquid or gaseous heat transfer fluid. In these systems it was necessary that high temperature and pressure seals be utilized along with considerable ancillary piping and distribution systems. These systems require some vent openings from the interior of the roll or as previously stated, it was necessary to use sealing systems to prevent the loss of vaporized heat transfer liquids. It has also been the practice in the past to use solid roll mills in which substantially the entire roll was made of a solid metallic material with a heater axially embedded in the roll. One drawback with respect to solid roll mills is that they may not provide even temperature distribution and also, necessarily, they are of considerable weight.

In view of the foregoing, it is an object of this invention to provide a method of heating a hollow roller.

It is an additional object of this invention to provide apparatus for heating a hollow roller.

It is a further object of this invention to provide a method and apparatus for heating hollow rollers in which the rollers are heated by a mechanical transfer of heat from a heating element to the roller surface.

It is a still further object of the invention to provide a method of heating a hollow rotating member by placing a heating element within the interior of the member and partially filling the member with a thermally conductive particulate medium, such that a portion of the medium flows continuously over the heating element and contacts the wall of the member.

Other and further objects will be apparent from the following detailed description taken in conjunction with the attached sheets of drawings wherein:

FIG. 1 is a vertical, sectional view of the heated roller of the invention;

FIG. 2 is a cross-sectional view taken at line 2—2 of FIG. 1;

FIG. 3 is a vertical, cross-sectional view similar to FIG. 2, illustrating the movement of the particulate heat transfer medium during rotation of the roller;

FIG. 4 is a vertical, cross-sectional view of a second embodiment of the invention in which the heating element is stationary;

FIG. 5 is a cross-sectional view taken on line 5—5 of FIG. 4; and

FIG. 6 is a view similar to FIG. 5 illustrating the movement of the particulate heat transfer medium as the roll rotates.

Referring specifically to FIGS. 1–3, the first embodiment of the invention will now be described in detail.

It should be pointed out that the specific roller of the invention was specifically developed to be used in a 3 roll mill for dispersing ink pigments. Roller 10 in actual practice is a chrome plated, hollow, welded steel cylinder. One end of the roller 10 is provided with an opening 11 within which a sleeve 12 is fixed. The sleeve 12 extends outwardly of the roller 10 and serves as the shaft for supporting one end of the roll for rotation about the longitudinal axis of the sleeve. The opposite end of the roller 10 is provided with an integral axle portion 13. A drive pulley 14 is fixed to the extending end 13 of the roller 10. An electric resistance cartridge heater 15 is fixed to the inner end of the sleeve 12 and extends throughout substantially the full length of the interior of the hollow roller 10. A pair of bearing supports 16 and 17 serve to mount the roller 10 for rotation about its longitudinal axis. A pair of leads 18 and 19 are connected to the heater 15 at one end and have their other ends connected to slip rings 20 and 21 which are carried by the sleeve 12. It should be understood that the roller 10, sleeve 12 and slip rings 20 and 21 rotate as a unit. A pair of brushes 22 and 23, carried by brush holders 24 and 25, bear against the slip rings and are held stationary by conventional means (not shown). The brushes in turn are connected to a source of power through an auto transformer 26. It should be apparent that the auto transformer serves to control the cartridge heater 15. Obviously, more sophisticated temperature control instruments could be utilized, particularly those in which the temperature of the roller 10 is measured and provides a feed back of temperature information to the auto transformer for control purposes.

As best shown in FIGS. 2 and 3, the interior of the hollow roller 10 is partially filled with a particulate transfer medium 27. In the particular embodiment of the invention constructed by applicants, the transfer medium 27 was composed of a silicon dioxide furnace sand conventionally used for making glass in which the particle size was less than 80 mesh. It should be pointed out that other heat transfer mediums may be utilized instead of silicon dioxide, such as nickel or silver shot. The requirements of the particulate medium are that it be relatively thermally conductive, suitably flowable, and reasonably chemically inactive. The volume of the particulate medium 27 should be such that a continuous layer of particles are flowing or tumbling over the central cartridge heater toward the outer wall of the roller when the roller is rotated in the speed range anticipated. In a particular case 400 cc. of $SiO_2$ was enclosed in a 650 cc. (internal volume) hollow roller. The tumbling action of the particulate medium 27 is best shown in FIG. 3 in which the roller 10 is rotating in the direction of the arrow 28.

In the embodiment shown in FIGS. 1–3, it is apparent that the heater element is fixed with respect to roller 10 and rotates therewith.

With reference to FIGS. 4–6, an alternative embodiment is disclosed in which the roller 10 is supported at its left hand end by suitable bearings in the same manner as the previously described embodiment illustrated in FIG. 1. However, the right hand end of the roller 10 is provided with an integral sleeve portion 29 with an axial opening 30 extending through the sleeve portion and through the end of roller 10. The roller is supported by suitable bearings 16 and 17 as in the previous embodiment. However, a heater support 31 is fixed to the stationary portion of the bearing support 17. In this particular embodiment the heater 15 is fixed at one end within heater support 31 by a set screw 34 with the end of the heater which extends to the roller 10 having a downwardly extending portion 32 and horizontal extending end portion 33. The horizontal portion 33 lies parallel to the inner bottom surface of the roller and is spaced thereabove a small amount. A heat transfer medium 27 partially fills the interior of the roller 10. As can be seen when viewing FIGS. 5 and 6, less heat transfer material 27 is necessary since the heater portion 33 is positioned relatively close to the bottom surface of the roller 10. In this particular embodiment the heater is stationary and does not rotate with the roller 10. As best shown in FIG. 6, when the roller 10 is rotating in the direction of the arrow 28 the particulate heat transfer medium 27 will assume an angle of repose as illustrated and there will be a continuous flow of heat transfer medium over the electric heater and into contact with the outer wall of the roller 10. In this manner heat is transferred from the heater portion 33 to the interior surface of roller 10 by the mechanical transfer of heat due to movement of the heated particles.

Thus it can be seen that applicants have developed a process and apparatus for heating a hollow roller in which the temperature distribution along the length of the roller is uniform. Furthermore, applicants' invention provides a heated roller which does not require high temperature and pressure seals as is the case in many presently existing heating rolls.

Applicants' invention has further utility in those situations where it is desirable that the heated roller have a temperature gradient about the circumference of the roller. The specific apparatus disclosed in FIGS. 4–6 is particularly suited to a situation in which it is desirable that the circumferential temperature of the roller be nonuniform. As can readily be seen when viewing these figures and in particular FIG. 6, the hottest portion of the roller will be adjacent to the heater portion 33 and to the left thereof, since the heated particles which will transfer heat from the heater portion 33 to the wall first arrive at a point on the wall in heated condition at this location. The roller 10 will absorb this heat, and as it continues to rotate will begin to cool down and there may be a temperature difference between the surface of the roll in the area adjacent to heater portion 33 and the upper portion of the roller which is uncovered with respect to the particulate medium. As stated above, in some instances it is desirable that the surface of the roller have a known, predetermined temperature gradient about the circumference thereof. This could be particularly desirable in a situation where a plurality of heated rolls are serving as the system for joining a plastic sheet and coating layer thereto.

While various specific embodiments of the invention have been disclosed in detail herein, other and further modifications and changes may be made without departing from the scope of the invention as set forth in the appended claims.

We claim:
1. A heating roller for use in a roll mill, said roller comprising an elongated hollow tubular shell, bearing shafts formed integral with the ends of said shell and one of which is provided with a longitudinal bore, an elongated tubular electric heating element sealed within the bore in said one shaft and extending axially of said shell throughout substantially its full length, a particulate heat transfer medium in said shell and whose volume is such that during rotation of said shell a continuous layer of said particulate medium flows over the heating element toward the shell wall by gravity and bearings for rotatably supporting the roller.

2. The apparatus as defined in claim 1, wherein the particulate heat transfer medium is silicon dioxide sand.

3. The apparatus as defined in claim 1, wherein the particulate heat transfer medium is silver shot.

4. A heating roller for use in a roll mill, said roller comprising an elongated hollow tubular shell, bearing shafts formed at the ends of said shell and one of which is provided with a longitudinal bore, an elongated tubular heating element sealed within the bore in said one shaft and extending axially of said shell throughout substantially its full length, a particulate heat transfer medium in said shell whose volume is such that during rotation of said shell a continuous layer of said particulate medium flows over the heating element toward the shell wall by gravity and bearings for rotatably supporting the roller.

5. The apparatus as defined in claim 4, wherein the particulate heat transfer medium is silicon dioxide sand.

6. The apparatus as defined in claim 4, wherein the particulate heat transfer medium is nickel shot.

7. A heating roller for use in a roll mill, said roller comprising an elongated hollow tubular shell, bearing shafts formed integral with the ends of said shell and one of which is provided with a longitudinal bore, an elongated tubular electric heating element extending within the bore in said one shaft and into the interior of said shell throughout substantially its full length, a particulate heat transfer medium in said shell whose volume is such that during rotation of said shell a continuous layer of said particulate medium flows over the heating element toward the shell wall by gravity and bearings for supporting the roller for rotation.

8. In a method for heating an elongated hollow tubular shell wherein a heating element is positioned within the interior of the shell, the improvement which comprises partially filling the shell with a thermally conductive, flowable, particulate medium and then transferring heat from the heating element to the shell by rotating the shell such that a continuous layer of the medium flows from the element to the shell.

9. In a method for heating an elongated hollow tubular shell wherein a heating element is positioned within the interior of the shell, the improvement which comprises partially filling the shell with a thermally conductive, flowable, particulate medium and then rotating the shell such that a continuous layer of particulate medium flows over the heating element so as to transfer heat by conduction from the element to the shell.

References Cited
UNITED STATES PATENTS

| | | | |
|---|---|---|---|
| 1,819,988 | 8/1931 | Jones | 165—89 |
| 2,448,514 | 9/1948 | Butler | 165—89 |
| 2,831,097 | 4/1958 | Malewksi | 219—470 |
| 3,020,383 | 2/1962 | Tsuneo Onishi et al. | 219—470 |
| 3,105,133 | 9/1963 | Norton | 219—469 |
| 3,146,078 | 8/1964 | Gerster | 219—469 X |

RICHARD M. WOOD, *Primary Examiner.*

L. H. BENDER, *Assistant Examiner.*

U.S. Cl. X.R.

219—470